US008781511B2

(12) United States Patent
Lee

(10) Patent No.: US 8,781,511 B2
(45) Date of Patent: Jul. 15, 2014

(54) IMAGE PROCESSING APPARATUS, CONTROL METHOD THEREOF, AND IMAGE PROCESSING SYSTEM

(75) Inventor: Sang-hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 957 days.

(21) Appl. No.: 12/705,777

(22) Filed: Feb. 15, 2010

(65) Prior Publication Data

US 2010/0330901 A1 Dec. 30, 2010

(30) Foreign Application Priority Data

Jun. 30, 2009 (KR) ........................ 10-2009-0058928

(51) Int. Cl.
*H04B 7/00* (2006.01)

(52) U.S. Cl.
USPC ........... 455/509; 455/450; 455/557; 370/351; 370/312; 370/329

(58) Field of Classification Search
CPC ..... H04W 88/06; H04W 36/22; H04W 40/02; H04W 40/12; H04W 48/16; H04W 72/1205; H04W 40/248; H04W 40/28; H04W 48/08; H04L 45/00; H04L 45/124; H04L 45/302; H04L 45/54
USPC .......... 455/550.1, 41.2, 450, 507, 552.1, 557, 455/553.1, 554.2, 509, 451, 452.1, 452.2; 370/328, 401, 349, 338, 351, 312, 252, 370/329
See application file for complete search history.

(56) References Cited

U.S. PATENT DOCUMENTS

| 7,068,624 | B1 | 6/2006 | Dantu et al. |
| 2004/0125775 | A1 | 7/2004 | Rios |
| 2004/0179512 | A1 | 9/2004 | Leblanc et al. |

(Continued)

FOREIGN PATENT DOCUMENTS

| GB | 2420954 A | 6/2006 |
| KR | 10-2003-0035227 A | 5/2003 |

(Continued)

OTHER PUBLICATIONS

Communication dated Dec. 1, 2011 issued by the European Patent Office in counterpart European Patent Application No. 10155917.7.

(Continued)

*Primary Examiner* — Sujatha Sharma
(74) *Attorney, Agent, or Firm* — Sughrue Mion, PLLC

(57) ABSTRACT

An image processing apparatus for performing wired and wireless communication includes: an image processing unit; a first access point module which communicates with an external apparatus through a first wireless communication channel and relays a communication between a plurality of external apparatuses through the first wireless communication channel; a client module which communicates with a second external access point module through a second wireless communication channel different from the first wireless communication channel; and a controller which switches communication data received through the first wireless communication channel or the second wireless communication channel to be selectively transmitted through one of the first wireless communication channel or the second wireless communication channel.

6 Claims, 3 Drawing Sheets

(56) References Cited

U.S. PATENT DOCUMENTS

| | | | |
|---|---|---|---|
| 2006/0246942 A1* | 11/2006 | Ramachandran et al. | 455/553.1 |
| 2007/0162181 A1* | 7/2007 | Ichieda | 700/225 |
| 2007/0274279 A1 | 11/2007 | Wood et al. | |
| 2008/0207253 A1* | 8/2008 | Jaakkola et al. | 455/550.1 |
| 2008/0316951 A1* | 12/2008 | Zeng et al. | 370/312 |
| 2008/0316997 A1 | 12/2008 | Zeng et al. | |
| 2008/0317047 A1* | 12/2008 | Zeng et al. | 370/401 |
| 2010/0303005 A1* | 12/2010 | Gossain et al. | 370/328 |
| 2011/0207490 A1* | 8/2011 | Lee et al. | 455/509 |
| 2011/0222523 A1* | 9/2011 | Fu et al. | 370/338 |
| 2011/0274080 A1* | 11/2011 | Ko et al. | 370/329 |
| 2012/0147780 A1* | 6/2012 | Gossain et al. | 370/252 |
| 2012/0302283 A1* | 11/2012 | Sun | 455/552.1 |

FOREIGN PATENT DOCUMENTS

| | | |
|---|---|---|
| KR | 10-2003-0056876 A | 7/2003 |
| KR | 10-2004-0054979 A | 6/2004 |
| KR | 10-2006-0018539 A | 3/2006 |
| KR | 10-2008-0016250 A | 2/2008 |
| WO | WO 2006119573 A1 | 11/2006 |

OTHER PUBLICATIONS

Communication from the European Patent Office issued on Jun. 6, 2011 in the corresponding European Patent Application No. 10155917.7.

European Search Report, dated Aug. 26, 2010, issued in European application No. 10155917.7.

* cited by examiner

IMAGE PROCESSING APPARATUS, CONTROL METHOD THEREOF, AND IMAGE PROCESSING SYSTEM

CROSS-REFERENCE TO RELATED APPLICATION

This application claims priority from Korean Patent Application No. 10-2009-0058928, filed on Jun. 30, 2009 in the Korean Intellectual Property Office, the disclosure of which is incorporated herein by reference.

BACKGROUND OF INVENTION

1. Field of Invention

Apparatuses and methods consistent with the present invention relate to an image processing apparatus capable of performing wired and wireless communication with an external apparatus, a control method thereof and an image processing system, and more particularly to an image processing apparatus having an improved structure of wired communication and a communication relay using an access point module, and a control method thereof and an image processing system.

2. Description of the Related Art

An image processing apparatus may include a set-top box, a digital versatile disc/blu-ray disc (DVD/BD) player, a television (TV) or the like in a home. The image processing apparatus processes a video signal received from an external source or reproduced by itself to be displayed. With development of technology and to meet a user's demand, the image processing apparatus has been developed to perform various additional functions in addition to its original function. For example, the image processing apparatus may perform data communication with an external apparatus having a function different from that of the image processing apparatus, and thus provide a user with more complicated and various functions through communication linking, function sharing, or the like with the external apparatus.

In particular, because installation of a wireless communication system is simpler than that of a wired communication system, the wireless communication system has recently been widely used as a home network system where the image processing apparatus and the external apparatus are connected to each other. However, to guarantee a wireless communication between the apparatuses, the wireless communication system needs to solve problems in compatibility of communication standards between the apparatuses, linkage with another network, occupancy of communication channels, etc., which are different from the problems of the wired communication.

SUMMARY OF THE INVENTION

An aspect of the present invention provides an image processing apparatus including: an image processing unit; a first access point module which communicates with an external apparatus through a first wireless communication channel and relays communication between a plurality of external apparatuses through the first wireless communication channel; a client module which communicates with an external second access point module through a second wireless communication channel different from the first wireless communication channel; and a controller which switches communication data received through the first wireless communication channel or the second wireless communication channel to be selectively transmitted through one of the first wireless communication channel or the second wireless communication channel.

The controller may select a wireless communication channel different from the wireless communication channel through which the communication data is received, and control the communication data received through the first wireless communication channel or the second wireless communication channel to be transmitted through the selected wireless communication channel.

The controller may extract a communication address of the external apparatus, to which the communication data will be transmitted, out of the received communication data, and detect which one of the first wireless communication channel and the second wireless communication channel can be used to transmit the communication data, on the basis of the extracted communication address.

The controller may extract the communication address when the communication data is received through the first access point module, detect whether the communication data can be transmitted to the second wireless communication channel with respect to the extracted communication address, and transmit the communication data to the client module if the communication data can be transmitted to the second wireless communication channel.

The controller may control the communication data to be transmitted through the first access point module if the communication data cannot be transmitted to the second wireless communication channel.

The image processing apparatus may further include an interface module to interface the first access point module and the client module with each other regarding the communication data.

The image processing apparatus may further include a wired communication module which transmits and receives the communication data through a wire and is accessed to be interfaced by the interface module, wherein the controller switches transmission of the communication data in the interface module.

Another aspect of the present invention provides a control method of an image processing apparatus, the control method including: relaying communication between a plurality of external apparatuses through a first wireless communication channel by a first access point module communicating with an external apparatus through the first wireless communication channel; communicating, by a client module, with an external second access point module through a second wireless communication channel different from the first wireless communication channel; and switching communication data received through the first wireless communication channel or the second wireless communication channel to be selectively transmitted through one of the first wireless communication channel or the second wireless communication channel.

The switching may include selecting a wireless communication channel different from the wireless communication channel through which the communication data is received, and controlling the communication data received through the first wireless communication channel or the second wireless communication channel to be transmitted through the selected wireless communication channel.

The switching may further include extracting a communication address of the external apparatus, to which the communication data will be transmitted, out of the received communication data, and detecting which one of the first wireless communication channel and the second wireless communication channel can be used to transmit the communication data, on the basis of the extracted communication address.

The extracting the communication address of the external apparatus may include: extracting the communication address when the communication data is received through the first access point module; and detecting whether the communication data can be transmitted to the second wireless communication channel with respect to the extracted communication address, and the detecting which one of the first wireless communication channel and the second wireless communication channel can be used to transmit the communication data may include transmitting the communication data to the client module if the communication data can be transmitted to the second wireless communication channel.

The transmitting the communication data to the first access point module or the client module selectively on the basis of the extracted communication address may include controlling the communication data to be transmitted through the first access point module if the communication data cannot be transmitted to the second wireless communication channel.

Still another aspect of the present invention provides an image processing system including: a plurality of external apparatuses; a first access point module which relays communication between the plurality of external apparatuses on the basis of a first wireless communication channel; and an image processing apparatus which includes a second access point module communicating with the external apparatus on the basis of a second wireless communication channel different from the first wireless communication channel and relaying the communication based on the second wireless communication channel between the plurality of external apparatuses, a client module communicating with the first access point module, and a controller switching communication data received through the first wireless communication channel or the second wireless communication channel to be selectively transmitted through one of the first wireless communication channel and the second wireless communication channel.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EXEMPLARY EMBODIMENTS

Below, exemplary embodiments of the present invention will be described in detail with reference to accompanying drawings.

Figure 1:
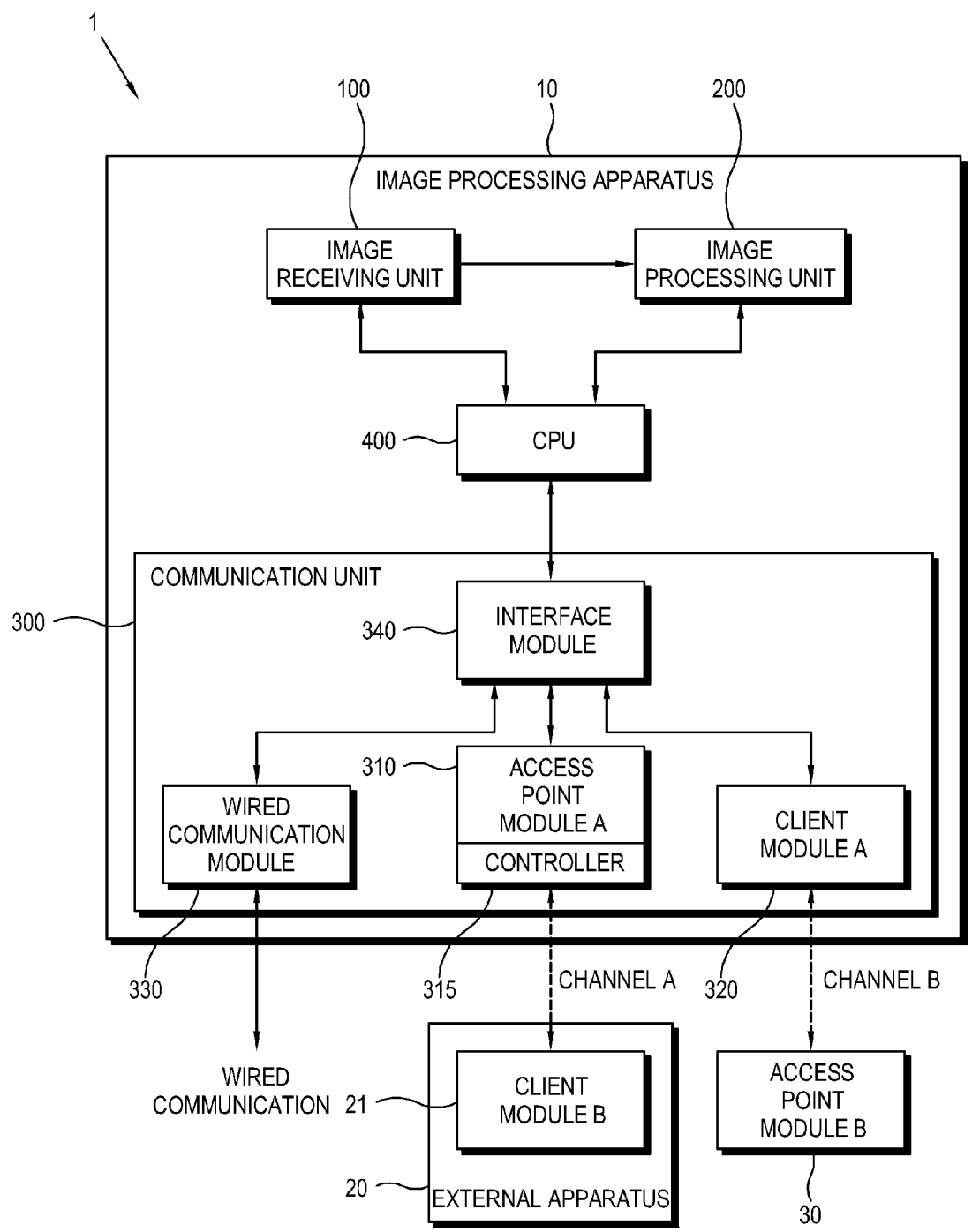
FIG. 1 is a block diagram schematically illustrating a configuration of an image processing apparatus in an image processing system according to an exemplary embodiment of the present invention.

FIG. 1 is a block diagram schematically illustrating a configuration of an image processing apparatus 10 in an image processing system 1 according to an exemplary embodiment of the present invention.

The image processing apparatus 10 in this exemplary embodiment can be realized without limitation, and any apparatus may be applied thereto as long as it can process an image received from an external source or stored therein through various methods. For example, the image processing apparatus 10 may be achieved by a television, a monitor, etc., which has a display panel (not shown), for example, but not limited to, a liquid crystal display panel (not shown) to display an image by itself. Alternatively, the image processing apparatus 10 may be achieved by, for example, but not limited to, a set-top box, a DVD/BD player, etc., which processes an image and transmits it to an external television or monitor without including the display panel (not shown) in itself.

As shown in FIG. 1, the image processing system 1 in this exemplary embodiment includes the image processing apparatus 10, and an external apparatus 20 capable of wirelessly communicating with the image processing apparatus 10. Further, the image processing apparatus 10 may perform a wired communication as well as a wireless communication. In FIG. 1, only one external apparatus 20 is shown, but this does not mean that the image processing apparatus 10 can communicate with only one external apparatus 20.

The image processing apparatus 10 includes an image receiving unit 100 to receive a video signal from an external source, an image processing unit 200 to process the received video signal to be finally displayed as an image through various methods and configurations, a communication unit 300 to perform a wired or wireless communication with various external apparatuses of the image processing system 1, and a central processing unit (CPU) 400 to control operation of the image processing apparatus 10.

In the image processing apparatus 10 according to the present exemplary embodiment, the communication unit 300 includes an access point module A 310 that performs a wireless communication with the external apparatus 20 through a predetermined channel A and may relay wireless communication between plural external apparatuses 20 through the channel A, a client module A 320 that communicates with an access point module B 30 through a predetermined channel B different from the channel A, and a controller 315 that controls communication data received through the channel A or B to be selectively transmitted via one of the channels A and B.

With this configuration, the image processing system 1 in this exemplary embodiment transmits the communication data received in the access point module A 310 to the channel B different from the channel A through the client module A 320 when the wireless communication of the channel A is performed via the access point module A 310. Thus, the data communication is performed through plural channels, so that a communication traffic in a certain channel can be decentralized.

Here, the channel A and the channel B, the access point module A 310 and the access point module B 30, the client module A 320 and a client module B 21 (to be described later), etc. are alphabetized to distinguish the elements having a like function.

Further, in this exemplary embodiment, the controller 315 and the access point module A 310 are formed as a single body, and it is described as if the access point module A 310 performs the control, but exemplary embodiments of the present invention are not limited thereto. For example, the controller 315 may be provided separately or integrally with other portions of the existing configuration such as the CPU 400.

Below, the elements of the image processing apparatus 10 will be described.

The image receiving unit 100 receives a video signal from an image source (not shown) or the like. The image receiving unit 100 may have various standards. For example, if the image processing apparatus 10 is a television, the image receiving unit 100 receives a radio frequency (RF) signal wirelessly from a broadcasting station (not shown), or receives video signals based on standards such as composite video, component video, super video, Scart, high definition multimedia interface (HDMI), etc. Also, if the image processing apparatus 10 is a monitor for a computer, the image receiving unit 100 may receive video signals according to standards such as D-Sub, digital video interactive (DVI), HDMI, etc. which can transmit an RGB signal based on VGA.

The image processing unit 200 applies various preset processes to the video signal received from the image receiving unit 100. The processes performed by the image processing unit 200 are not limited, and may include decoding and encoding corresponding to various video formats, de-interlacing, frame refresh rate conversion, scaling, noise reduction for improving image quality, detail enhancement, etc. The image processing unit 200 may include individual configurations that performs the processes, or an integrated configuration where various functions are combined.

The communication unit 300 performs communication between the image processing apparatus 10 and the external apparatus 20, or relays communication between the plural external apparatuses 20. In the former case, the communication unit 300 receives data from the external apparatus 20 and transmits it to the CPU 400, or receives data from the CPU 400 and transmits it to the external device 20. In the latter case, the communication unit 300 transmits data from one of the external apparatuses 20 to another external apparatus 20. Such a communication relay between the external apparatuses 20 may be achieved in the case of a plurality of one-to-one communications between two external apparatuses, a communication among three or more external apparatuses 20, etc.

More detailed configurations of the communication unit 300 will be described later.

The CPU 400 controls the image receiving unit 100, the image processing unit 200 and the communication unit 300 to thereby control operation of the image processing apparatus 10. However, the CPU 400 does not control the entire operation of the image processing apparatus 10, and individual microcontrollers (not shown) may be provided in elements, respectively, to thereby control at least some operation of the corresponding elements. In this exemplary embodiment, the operation of the communication unit 300 is controlled by the access point module A 310 provided with the controller 315, but not limited thereto.

Below, the configuration of the communication unit 300 will be described in more detail.

The communication unit 300 includes the access point module A 310 capable of performing wireless communication with the external apparatus 20 via the channel A and relaying wireless communication between a plurality of external apparatuses 20 via the channel A; the client module 320 performing the wireless communication with the outside via the channel B; a wired channel module 330 for the wired communication; and an interface module 340 performing a switch of data transmission between each module 310, 320, 330 and the CPU 400.

For convenience of description, the wireless communication in this exemplary embodiment is based on wireless fidelity (Wi-Fi) standards, but is not limited thereto. Alternatively, the wireless communication may be based on various standards.

Below, the wireless communication channels such as the channels A and B will be described. In the case of the Wi-Fi standards, there are applied two broad-bands of 2.4 GHz and 5 GHz. Each broad-band has a plurality of channels divided according to frequencies, and the wireless communication is performed through one of the channels.

To achieve the wireless communication between two apparatuses, there are needed the access point modules 30 and 310 to relay the wireless communication between both apparatuses, and the wireless communication is performed through the wireless communication channels corresponding to the access point modules 30 and 310. Such a wireless communication method is called an infrastructure mode and is basic to the Wi-Fi standards.

However, the Wi-Fi standards also have an adhoc mode where two apparatuses can directly communicate with each other without the relay of the access point modules 30 and 310. However, the adhoc mode is inconvenient for setting up a communication connection, and many apparatuses do not support the adhoc mode. The plurality of apparatuses constituting the image processing system 1 may include one that does not support the adhoc mode. Further, if the adhoc mode is applied among only some apparatuses, the whole network connection of the image processing system 1 may deteriorate in efficiency. Accordingly, the image processing system 1 in this exemplary embodiment performs the wireless communication on the basis of the infrastructure mode.

Using Wi-Fi, it is difficult for the access point modules 30 and 310 to directly wirelessly communicate with other access point modules 30 and 310 regardless of whether the wireless communication channels are equal to or different from each other. In this exemplary embodiment, the access point modules 30 and 310 employ their own wireless communication channels, but exemplary embodiments are not limited thereto.

Below, the elements of the communication unit 300 will be described.

The access point module A 310 may serve as not only a communication terminal but also a communication relay through its own channel A.

The access point module A 310 makes wireless communication possible between the external apparatus 20 and the image processing apparatus 10, and performs data transmission with the client module B 21 provided in the external apparatus 20 via the channel A. If the data is transmitted from the image processing apparatus 10 to the external apparatus 20, the access point module A 310 transmits the data received from the CPU 400 to the client module B 21. On the other hand, if the data is transmitted from the external apparatus 20 to the image processing apparatus 10, the access point module A 310 transmits the data received from the client module B 21 to the CPU 400.

Meanwhile, the access point module A 310 may relay wireless communication between two external apparatuses 20. The access point module A 310 analyzes a packet of the data received from the external apparatus through the channel A, and extracts a communication address such as an Internet protocol (IP) address. The access point module A 310 transmits the corresponding data to the CPU 400 if the extracted communication address corresponds to the image processing apparatus 10. Otherwise, the access point module A 310 transmits the corresponding data to the extracted communication address through the channel A.

When extracting the communication address, the access point module A 310 detects whether wireless communication using the channel B is possible with respect to the corresponding communication address. Such a detecting method is not limited, but various structures and methods may be used. For example, a communication route in the image processing system 1 is stored according to control-signal exchanges with the external apparatuses 20 when the image processing apparatus 10 is turned on.

When it is detected that wireless communication using the channel B is possible with respect to the communication address, the access point module A 310 sends the corresponding data to the client module A 320 to thereby transmit it through the channel B. Thus, the communication data may be transmitted and received through a plurality of channels A and B.

On the other hand, when it is detected that wireless communication using the channel B is impossible with respect to the communication address, the access point module A 310 directly transmits the corresponding data to the corresponding communication address through the channel A without sending it to the client module A 320.

Further, the access point module A 310 extracts the communication address out of the corresponding data when the client module A 320 receives the data through the channel B. The access point module A 310 transmits the corresponding data to the CPU 400 if the extracted communication address corresponds to the image processing apparatus 10. In contrast, the access point module A 310 may transmit the corresponding data via the channel A if the extracted communication address does not correspond to the image processing apparatus 10.

The client module A 320 performs wireless communication through the channel B different from the channel A corresponding to the access point module A 310. The client module A 320 can serve as a terminal for wireless communication using the channel B, but does not relay wireless communication differently from the access point modules 30 and 320.

The client module A 320 performs wireless communication with the access point module B 30 external to the image processing apparatus 10 via the channel B. If wireless communication using the channel B is performed between the image processing apparatus 10 and the external apparatus 20, a communication route is formed between the client module A 320 and the external apparatus 20 via the access point module B 30.

The interface module 340 interfaces the access point module A 310, the client module A 320, the wired communication module 330 and the CPU 400 with one another with respect to data flow. In particular, the interface module 340 can interface so that data can be transmitted between the access point module A 310 and the client module A 320 having different wireless communication channels. The interface module 340 is provided with ports (not shown) corresponding to various data transmission standards, and switches a data route under control of the access point module A 310, the CPU 400 or the like.

Figure 2:
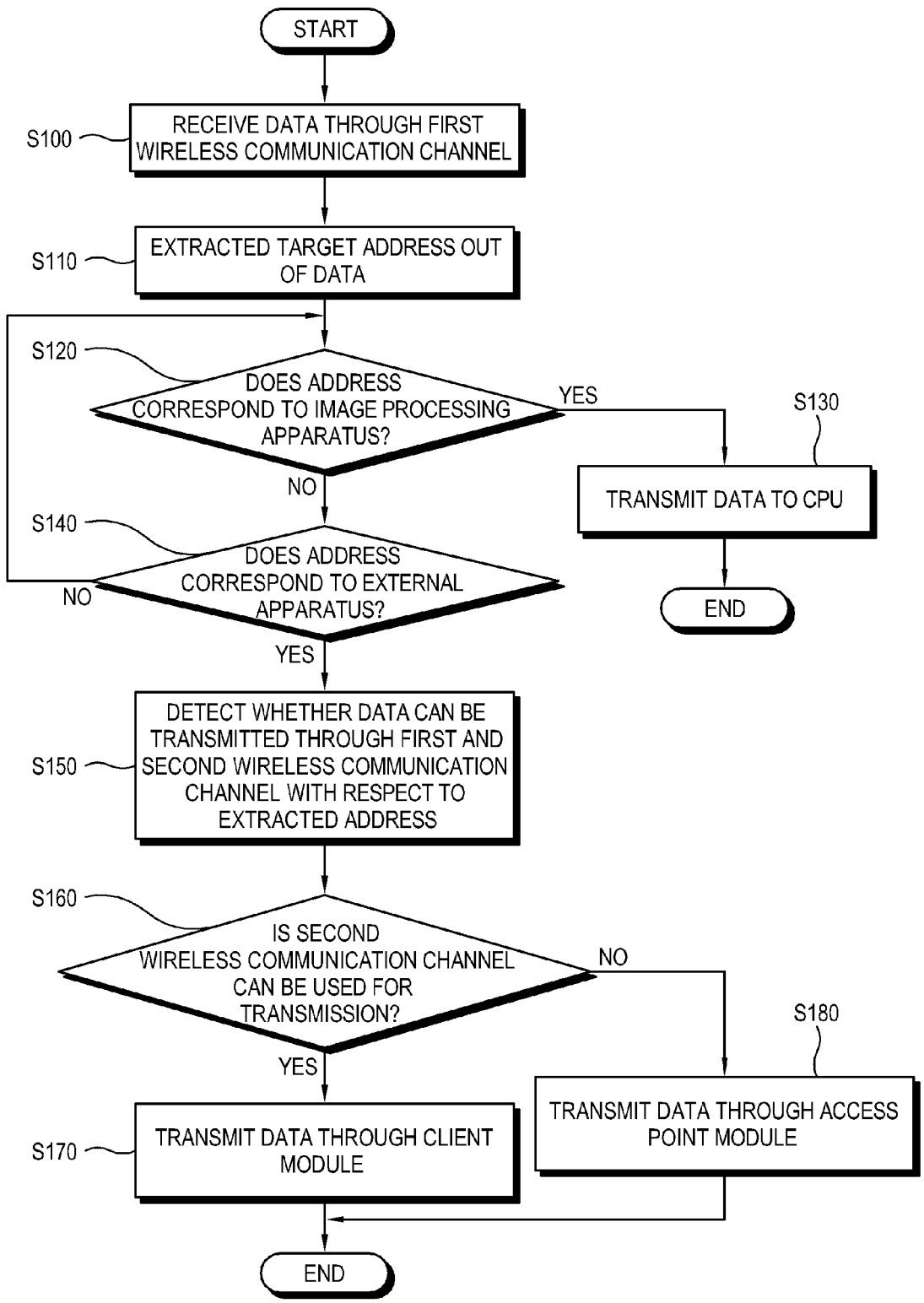
FIG. 2 is a flowchart illustrating a control method of the image processing apparatus of FIG. 1.

With this configuration, a process of performing data communication in the image processing apparatus 10 according to an exemplary embodiment of the present invention will be described with reference to FIG. 2. FIG. 2 is a flowchart of a control method for the image processing apparatus 10.

In FIG. 2, the channels A and B described in FIG. 1 will be referred to as first and second wireless communication channels, respectively. Like the channels A and B, such terms are selected for clarity without limiting the scope of the present invention.

As shown in FIG. 2, the access point module A 310 receives data through the first wireless communication channel (S100). The access point module A 310 extracts a target address, to which the received data will be transmitted, out of the corresponding data (S110).

The access point module A 310 determines whether the extracted address corresponds to the image processing apparatus 10, that is, corresponds to an apparatus including the access pointing module A 310 (S120).

If the extracted address corresponds to the image processing apparatus 10 (S120-Y), the access point module A 310 transmits the corresponding data to the CPU 400 of the image processing apparatus 10 (S130).

On the other hand, if the drawn address does not correspond to the image processing apparatus 10 (S120-N), the access point module A 310 determines whether the extracted address corresponds to the external apparatus 20 (S140).

If the extracted address corresponds to the external apparatus 20 (S140-Y), the access point module A 310 detects whether the corresponding data can be transmitted through the first wireless communication channel and the second wireless communication channel with respect to the extracted address (S150).

As a result of the detection, if the data can be transmitted through the second wireless communication channel (S160-Y), the access point module A 130 transmits the data to the second wireless communication channel via the client module A 320 (S170).

On the other hand, if the data cannot be transmitted through the second wireless communication channel (S160-N), the access point module A 310 transmits the data to the corresponding address via the first wireless communication channel (S180).

Thus, the wireless communication using the access point module A 310 is performed, the access point module A 310 employs the second wireless communication channel to transmit the data received through the first wireless communication channel. Accordingly, traffic of the wireless communication on a certain channel can be decentralized, thereby guaranteeing quality of wireless communication.

Below, in the image processing system 1 according to this exemplary embodiment, different embodiments of communication performed between the image processing apparatus 10 and other external apparatuses 20 will be described with reference to FIG. 3.

Figure 3:
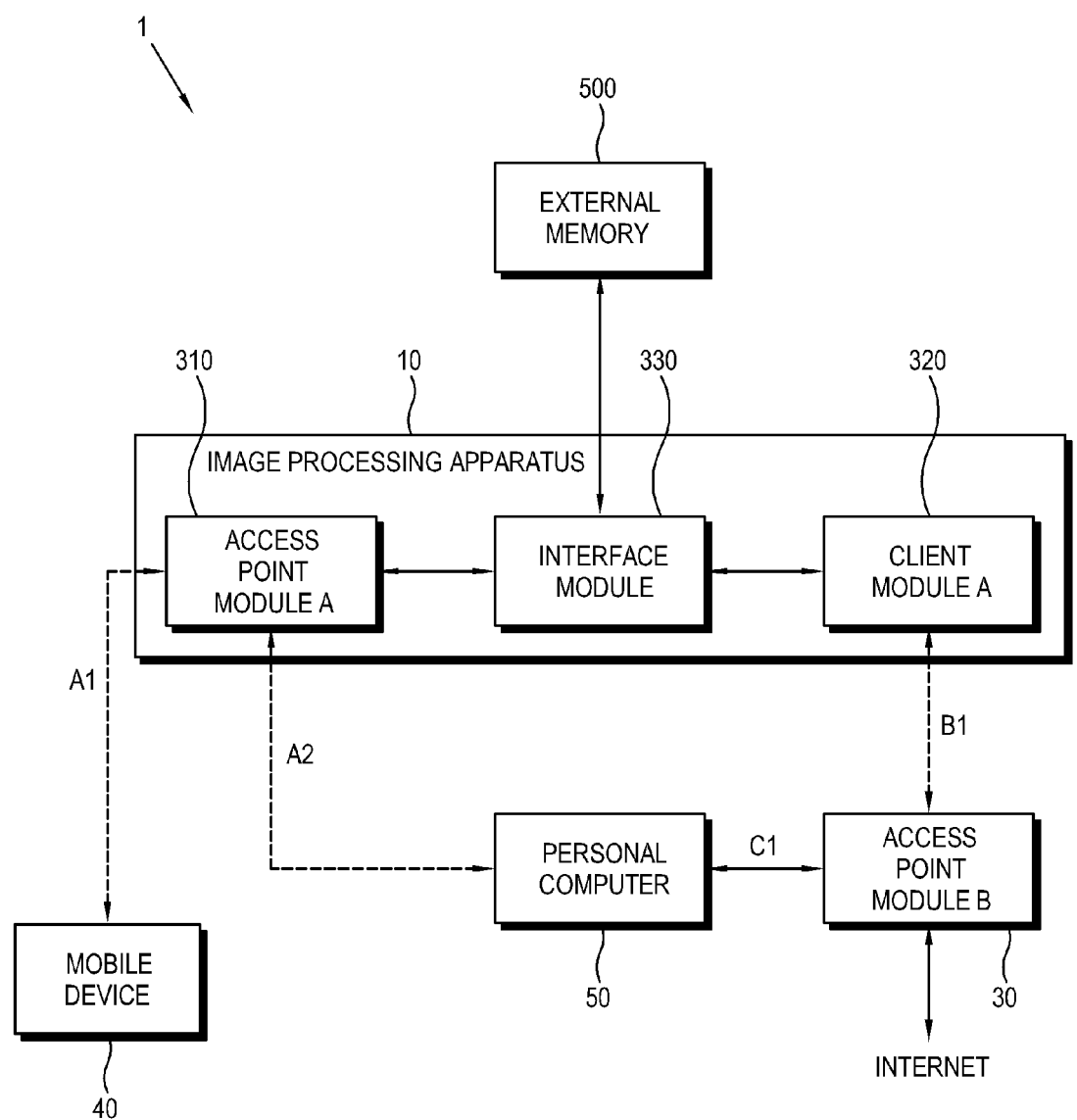
FIG. 3 is a block diagram illustrating a communication route in an image processing system according to an exemplary embodiment of the present invention.

FIG. 3 is a block diagram showing a route where the communication is performed in the image processing system 1 according to this embodiment of the present invention.

As shown in FIG. 3, the image processing system 1 includes the image processing apparatus 10, a mobile device 40 and a personal computer 50, and is provided with the access point module B 30 for wired internet connection. Here, the terms, numbers, arrangements, etc. of each device does not limit the scope of the present invention. Further, FIG. 3 shows only minimum elements for explaining this exemplary embodiment, and omits the other elements.

Further, a practical wireless communication is affected by a physical distance between the apparatuses, but such a factor was ignored for convenience in this exemplary embodiment.

First, a communication route shown in FIG. 3 will be described. A solid line indicates a wired communication route, but a dotted line indicates a wireless communication route.

A wireless communication route A1 between the access point module A 310 and the mobile device 40 and a wireless communication route A2 between the access point module A 310 and the personal computer 50 are all based on the same channel A. Also, a wireless communication route B1 between the access point module B 30 and the client module A 320 is based on the channel B different from the foregoing channel A.

That is, the communication routes A1 and A2 and the communication route B1 are different in the using channel.

A communication route C1 between the access point module B 30 and the personal computer 50 is a wired route. Further, a route between internal elements of the image processing apparatus 10 is also a wired route.

First, a method that a user accesses an external memory 500 mounted to the image processing apparatus 10 through the personal computer 50 will be described. The image processing apparatus 10 may include an internal memory, or the external memory 500 such as a universal serial bus (USB) memory or the like may be mounted to the image processing apparatus 10 through a port (not shown) provided in the outside of the image processing apparatus 10.

The personal computer 50 has two ways for accessing the image processing apparatus 10 mounted with the external memory 500. One is a way of accessing the access point module A 310 via the route A2. The other one is a way of accessing the access point module B 30 via the route C1 and then accessing the client module A 320 via the route B1.

Since both of the ways employ one communication route A2, B1 per wireless communication channel, there is little difference in the traffic of the wireless communication channels between the two ways.

Second, a communication method between the mobile device 40 and the personal computer 50 will be described.

The mobile device 40 has two ways for accessing the personal computer 50. One is a way of accessing the personal computer 50 along the routes A1 and A2 from the mobile device 40, and the other one is a way of following the route A1, the route B1 and the route C1.

In the former case, because the route A1 and the route A2 are all based on the same channel A, the traffic on the same channel may increase while the wireless communication is performed. To reduce the traffic, the access point module A 310 detects whether the data received via the route A1 can be transmitted to a route other than the route A2.

Thus, the access point module A 310 detects another communication route from the access point module A 310 to the personal computer 50, and transmits the corresponding data to the client module A 320 through the interface module 340 so that the data can be transmitted as in the latter case.

In this case, since the route B1 based on the channel B and the wired route C1 are selected as the communication routes from the access point module A 310 to the personal computer 50, the latter case can decrease the traffic on the channel A as compared with the former case.

Third, a method that the mobile device 40 accesses the Internet will be described. To this end, the mobile device 40 has to access the access point module B 30.

In this case, there may be considered a way of following the route A1, the route A2 and the route C1, and a way of following the route A1 and the route B1. In connection with this, the former case has a larger traffic on the channel A than the latter case. As compared with the former case, the latter case replaces some of the communication route of the channel A with the communication route of the channel B, so that the traffic occupancy on a certain channel can be relatively decreased. Accordingly, the quality of the wireless communication can be stably guaranteed.

In the foregoing exemplary embodiment, the physical distance between the apparatuses is not considered. However, in the case of the Wi-Fi wireless communication, if the physical distance between the apparatuses becomes longer, the communication speed is seriously lowered due to the traffic occupancy on the certain channel.

For example, in FIG. 3, assuming that the image processing apparatus 10 and the mobile device 40 are arranged close to each other, but the personal computer 50 and the access point module B 30 are arranged distantly from the image processing apparatus 10 and the mobile device 40, a direct access from the mobile device 40 to the access point module B 30 may cause a problem in the quality of the communication. Therefore, in this case, it is preferable in light of the quality of the communication that the mobile device 40 accesses the access point module B 30 via the image processing apparatus 10.

In view of the physical distance, the physical distances of the route A2 and the route B1 may be much larger than that of the route A1. Thus, if the wireless communication is performed via the route A1 and the route A2 between the mobile device 40 and the personal computer 50, such a physical distance may cause a serious increase in the traffic occupancy on the channel A. Accordingly, the route A2 is replaced by the route B1 of the different channel and the wired route C1, so that the quality of the communication can be enhanced over that when using the routes A1 and A2 of one channel.

Thus, according to an exemplary embodiment of the present invention, it is expected that the quality of the communication can be enhanced as the physical distance between the apparatuses becomes larger.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
   an image processing unit;
   a first access point module which relays a communication between a plurality of external apparatuses through a first wireless communication channel;
   a client module which communicates with a second external access point module through a second wireless communication channel different from the first wireless communication channel; and
   a controller which switches communication data received through the first wireless communication channel or the second wireless communication channel to be selectively transmitted through one of the first wireless communication channel or the second wireless communication channel,
   wherein the controller, if the first access point module receives data from a first external apparatus of the plurality of apparatuses via the first wireless communication channel, extracts an address from the received data and determines whether the address corresponds to the image processing apparatus, the address being a target address to which the received data is transmitted,
   wherein the controller transmits the received data to the image processing apparatus if the address corresponds to the image processing apparatus, determines whether the address corresponds to a second external apparatus of the plurality of apparatuses if the address does not correspond to the image processing apparatus, detects whether the received data can be transmitted through the first wireless communication channel and the second wireless communication channel if the address corresponds to the second external apparatus, and determines whether the received data can be transmitted through the second wireless communication channel with respect to the address,
   wherein the controller transmits the received data through the second wireless communication channel via the client module to the second external access point module being connected to the second external apparatus if the received data can be transmitted through the second wireless communication channel, and transmits the received data to the second external apparatus via the first wireless communication channel if the received data cannot be transmitted through the second wireless communication channel.

2. The image processing apparatus according to claim 1, wherein the controller selects a wireless communication channel different from the wireless communication channel through which the communication data is received, and controls the communication data received through the first wireless communication channel or the second wireless communication channel to be transmitted through the selected wireless communication channel.

3. The image processing apparatus according to claim 1, further comprising an interface module to interface the first access point module and the client module with each other regarding the communication data.

4. The image processing apparatus according to claim 3, further comprising a wired communication module which transmits and receives the communication data through a wire and is accessed to be interfaced by the interface module,
    wherein the controller switches transmission of the communication data in the interface module.

5. A control method of an image processing apparatus, the control method comprising:
    relaying communication between a plurality of external apparatuses through a first wireless communication channel by a first access point module;
    by a client module, communicating with an external second access point module through a second wireless communication channel different from the first wireless communication channel; and
    switching communication data received through the first wireless communication channel or the second wireless communication channel to be selectively transmitted through one of the first wireless communication channel or the second wireless communication channel, wherein, the switching comprises:
    if the first access point module receives data from a first external apparatus of the plurality of apparatuses via the first wireless communication channel, extracting an address from the received data and determining whether the address corresponds to the image processing apparatus, the address being a target address to which the received data is transmitted,
    transmitting the received data to an image processing unit of the image processing apparatus if the address corresponds to the image processing apparatus, determining whether the address corresponds to a second external apparatus of the plurality of apparatuses if the address does not correspond to the image processing apparatus, detecting whether the received data can be transmitted through the first wireless communication channel and the second wireless communication channel if the address corresponds to the second external apparatus, and determining whether the received data can be transmitted through the second wireless communication channel with respect to the address, and
    transmitting the received data through the second wireless communication channel via the client module to the external second access point module connected to the second external apparatus if the received data can be transmitted through the second wireless communication channel, and transmitting the received data to the second external apparatus via the first wireless communication channel if the received data cannot be transmitted through the second wireless communication channel.

6. The control method according to claim 5, wherein the switching comprises selecting a wireless communication channel different from the wireless communication channel through which the communication data is received, and controlling the communication data received through the first wireless communication channel or the second wireless communication channel to be transmitted through the selected wireless communication channel.

* * * * *